United States Patent Office.

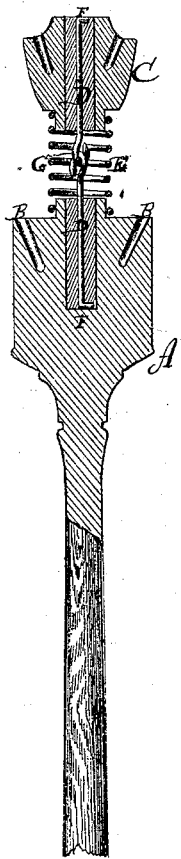

M. A. GOODENOUGH, OF NEW YORK, N. Y.

Letters Patent No. 98,759, dated January 11, 1870.

IMPROVED FEATHER DUSTER.

The Schedule referred to in these Letters Patent and making part of the same

To all whom it may concern:

Be it known that I, M. A. GOODENOUGH, of the city, county, and State of New York, have invented a new and useful Improvement in Feather Dusters; and I do hereby declare that the following is a full, clear, and exact description thereof, which will enable others skilled in the art to make and use the same, reference being had to the accompanying drawing, forming part of this specification.

This invention consists in the manner in which the flexible connection between the centre and the base of the brush is formed.

The accompanying drawing represents a longitudinal section of a feather duster, handle, and centre-block, showing the manner in which my flexible or spring-centre is constructed and connected with the handle.

Similar letters of reference indicate corresponding parts.

A is the handle, having a row of holes, B, in its end, into which the long feathers of the duster are inserted.

C is the centre-block, into which the centre feathers of the duster are inserted.

The block C is connected with the handle A by means of a universal joint formed of the rods D D, and by the spiral spring E, around the joint, and confined between the block C and the handle A, as seen in the drawing. The spring is compressed when the rods are joined together, as seen, so that the tendency of it is to force the block and the handle from each other, and thereby form a highly elastic connection.

To prevent the centre-block from being drawn from the handle, and for the purpose of making the connection perfectly strong and durable, I attach the rods D to the block and to the handle, by means of plugs F F, each of which is formed of two pieces, or semi-circular parts, which are placed together around the rods, after the ends of the rods have been turned to a right angle, as seen, to prevent their withdrawal.

When the plugs are thus placed around the rods, they are driven into the block and handle, suitable holes being bored therefor, where they are glued and securely fastened.

G is the universal joint, formed by eyes, which hook together, as seen in the drawing.

The rods D D may be passed through solid plugs, instead of plugs in two or more parts, and the ends of the rods may be bent afterward, to prevent their being pulled out, or the ends of the rods may be provided with screw-nuts, or they may be screwed in any other manner.

In case firm or hard wood is used for the handles, or for the centre-block, the rods may be screwed therein sufficiently tight to form a durable connection. In order to make the duster light, the handle is usually made of light wood; and with such wood, I have found the above mode of fastening, the most desirable, as it is simple and durable.

Having thus described my invention,

I claim as new, and desire to secure by Letters Patent—

A feather duster, having the handle A perforated in its centre, the correspondingly-perforated block C, the plugs F, the jointed rods D D, and the spring E, all constructed and adjusted as and for the purpose specified.

M. A. GOODENOUGH.

Witnesses:
  GEO. W. MABEE,
  ALEX. F. ROBERTS.